United States Patent
Cha

(10) Patent No.: US 6,783,632 B2
(45) Date of Patent: Aug. 31, 2004

(54) PROCESS FOR EFFICIENT MICROWAVE HYDROGEN PRODUCTION

(76) Inventor: Chang Yul Cha, 3807 Reynolds St., Laramie, WY (US) 82072

(*) Notice: Subject to any disclaimer, the term of this patent is extended or adjusted under 35 U.S.C. 154(b) by 0 days.

(21) Appl. No.: 10/449,435

(22) Filed: May 30, 2003

(65) Prior Publication Data

US 2003/0206855 A1 Nov. 6, 2003

Related U.S. Application Data

(62) Division of application No. 09/774,819, filed on Jan. 31, 2001, now Pat. No. 6,592,723.

(51) Int. Cl.[7] .............................. C01B 3/02; C01B 3/36
(52) U.S. Cl. .............................. 204/157.52; 204/157.47
(58) Field of Search ....................... 204/157.52, 157.47

(56) References Cited

U.S. PATENT DOCUMENTS

| 4,177,120 A | * | 12/1979 | Zenty ..................... 204/157.52 |
| 5,164,054 A | * | 11/1992 | Cha et al. ............... 204/157.47 |
| 5,198,084 A | * | 3/1993 | Cha et al. ............... 204/157.47 |

* cited by examiner

*Primary Examiner*—Wayne A. Langel
(74) *Attorney, Agent, or Firm*—John O. Mingle

(57) ABSTRACT

The present invention provides a potentially economically viable process for the efficient microwave catalysis production of hydrogen involving a modified steam-reforming reaction using light hydrocarbons or light alcohols as the basic reactant with supplementary oxygen to increase the efficiency. Such hydrogen-rich gas is potentially an economical fuel for fuel cells.

17 Claims, 1 Drawing Sheet

PROCESS FOR EFFICIENT MICROWAVE HYDROGEN PRODUCTION

This application is a divisional of application Ser. No. 09/774,819, filed Jan. 31, 2001 now U.S. Pat. No. 6,592,723.

BACKGROUND OF INVENTION

1. Field of Invention.

The present invention relates to a process using radiofrequency microwave energy to efficiently produce hydrogen from a source of hydrocarbons and oxygen with water.

2. Background.

Clean energy production is a noble task and fuel cells are one important ingredient. Yet fuel cells require a hydrogen-rich gas, and the subject invention has the potential to supply this by utilizing the high efficiency of microwave catalysis in reforming commonly available fuels, such as light hydrocarbons including alcohols, into cost effective hydrogen.

Microwaves are a form of quantum radiofrequency (RF) energy that is based upon the phenomenon of resonant interaction with matter of electromagnetic radiation in the microwave and RF regions since every atom or molecule can absorb, and thus radiate, electromagnetic waves of various wavelengths. The rotational and vibrational frequencies of the electrons represent the most important frequency range. The electromagnetic frequency spectrum is usually divided into ultrasonic, microwave, and optical regions. The microwave region is from 300 megahertz (MHz) to 300 gigahertz (GHz) and encompasses frequencies used for much communication equipment. For instance, refer to Cook, *Microwave Principles and Systems*, Prentice-Hall, 1986.

Often the term microwaves or microwave energy is applied to a broad range of radiofrequency energies particularly with respect to the common heating frequencies, 915 MHz and 2450 MHz. The former is often employed in industrial heating applications while the latter is the frequency of the common household microwave oven and therefore represents a good frequency to excite water molecules. In this writing the term "microwave" or "microwaves" is generally employed to represent "radiofrequency energies selected from the range of about 500 to 5000 MHz", since in a practical sense this large range is employable for the subject invention.

The absorption of microwaves by the energy bands, particularly the vibrational energy levels, of atoms or molecules results in the thermal activation of the nonplasma material and the excitation of valence electrons. The nonplasma nature of these interactions is important for a separate and distinct form of heating employs plasma formed by arc conditions at a high temperature, often more than 3000° F., and at much reduced pressures or vacuum conditions. For instance, refer to Kirk-Othmer, *Encyclopedia of Chemical Technology*, 3rd Edition, Supplementary Volume, pages 599–608, Plasma Technology. In microwave technology, as applied in the subject invention, neither of these conditions is present and therefore no plasmas are formed.

Microwaves lower the effective activation energy required for desirable chemical reactions since they can act locally on a microscopic scale by exciting electrons of a group of specific atoms in contrast to normal global heating which raises the bulk temperature. Further this microscopic interaction is favored by polar molecules whose electrons become easily locally excited leading to high chemical activity; however, nonpolar molecules adjacent to such polar molecules are also affected but at a reduced extent. An example is the heating of polar water molecules in a common household microwave oven where the container is of nonpolar material, that is, microwave-passing, and stays relatively cool.

In this sense microwaves are often referred to as a form of catalysis when applied to chemical reaction rates. In this writing the term "microwave catalysis" refers to "the absorption of microwave energy by carbonaceous materials when a simultaneous surface chemical reaction is occurring." This gives rise to two slightly different forms of microwave catalysis. The first employs a carbonaceous material with a large internal pore surface to act as a chemical reaction surface. Activated carbon is a good example of this medium. The second form involves the use of conventional catalysts with carbonaceous material physically near this surface, and now the reaction occurs on the catalyst surface, while localized molecular energizing happens in close proximity. A good example of this is the use of silicon carbide either embedded in the catalyst substrate or alternately finely mixed with catalyst material. The subject invention employs both forms of microwave catalysis. For instance, refer to Kirk-Othmer, *Encyclopedia of Chemical Technology*, 3rd Edition, Volume 15, pages 494–517, Microwave Technology.

Related United States patents include:

| No. | Inventor | Year |
|---|---|---|
| 4,869,894 | Wang, et al. | 1989 |
| 5,164,054 | Cha et al.—1 | 1992 |
| 5,198,084 | Cha et al.—2 | 1993 |
| 5,256,265 | Cha | 1993 |

Referring to the above list, Wang et al. disclose conventional hydrogen production involving natural gas primary reforming and oxygen secondary reforming utilizing high temperatures above 1650° F. No mention of microwave energy is made.

Cha et al.—1 disclose a process for hydrogen production, employing radiofrequency energy with carbon black and hydrocarbon gases, particularly from mild gasification of coal. No oxygen is employed or suggested.

Cha et al.—2, related to Cha et al.—1, disclose a process for hydrogen production employing radiofrequency energy with char and a hydrogen-containing gas, such as water or hydrocarbons, particularly from mild gasification of coal. No oxygen is employed or suggested.

Cha discloses char-gas oxide reactions, such as NOx decomposition, and presents the background for efficient microwave catalysis usage for chemical reactions. The specification of this patent is hereby incorporated by reference.

SUMMARY OF INVENTION

The objectives of the present invention include overcoming the above-mentioned deficiencies in the prior art and providing a potentially economically efficient process for the microwave production of hydrogen-rich gas for potentially fuel cell usage.

DETAILED DESCRIPTION OF INVENTION

Figure 1:
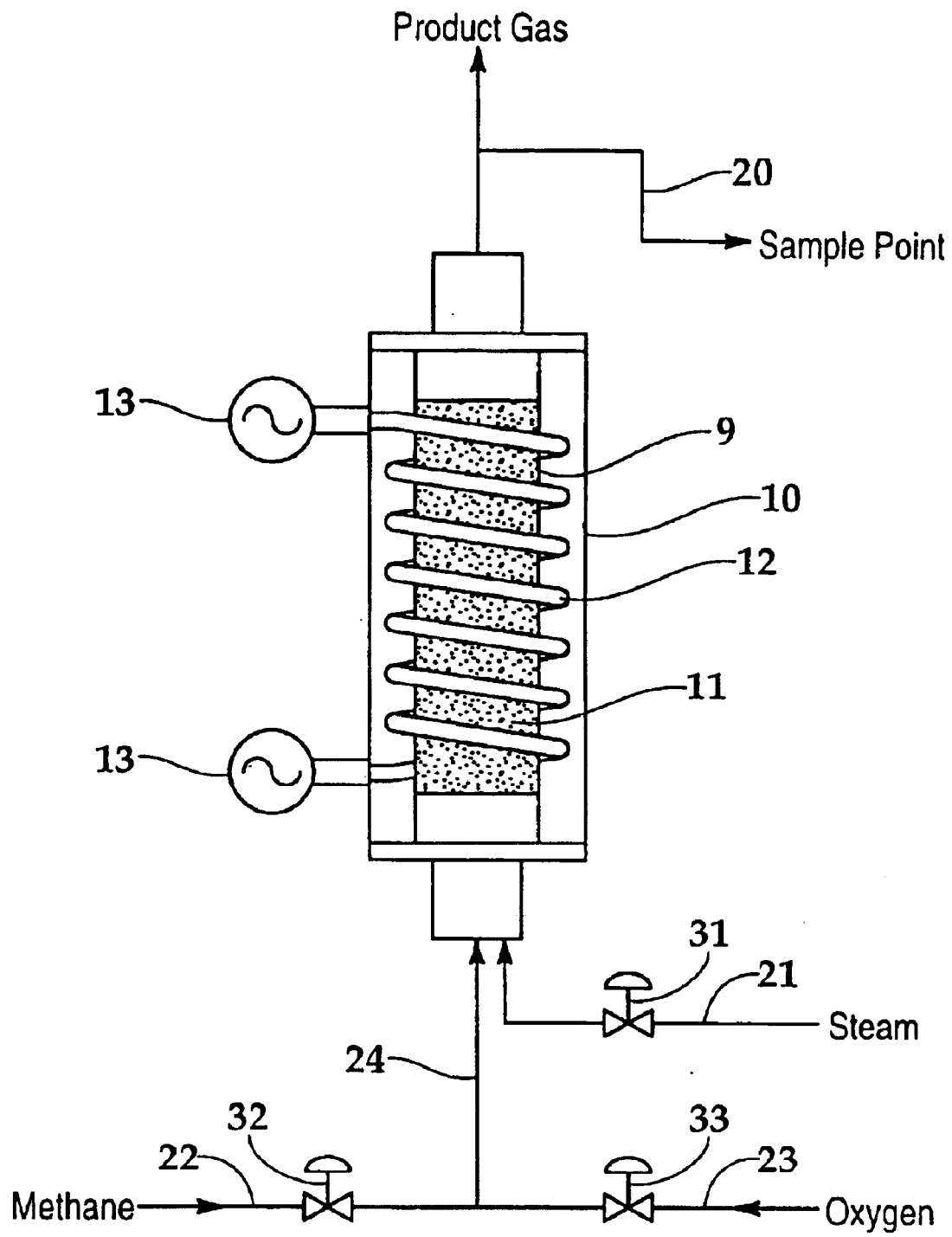
FIG. 1 shows the process equipment utilized with the microwave cavity to produce hydrogen.

Microwaves are a versatile form of energy that is applicable to enhance chemical reactions since the energy is locally applied by its largely vibrational absorption by polar molecules and further does not produce plasma conditions. Particularly reactions that proceed by free-radical mechanisms are often enhanced to higher rates because their initial equilibrium thermodynamics is unfavorable. A second class of enhanced reactions are those whose reaction kinetics appear unfavorable at desirable bulk temperature conditions.

Carbonaceous material is an excellent microwaves absorber since it has a wide range of polar impurities that readily interact with such radiofrequency energy especially in electron vibrational modes. Consequently the waveguide design for the microwave cavity is not usually critical. Carbonaceous material for use with the subject invention commonly comprises activated carbon, char, soot, pyrolytic carbon, carbon black, activated charcoal, and metal carbides. However in gaseous systems temperature resistant carbonaceous materials, such as silicon carbide, are often prudent and are conveniently utilized as a microwave absorbing substrate when elevated temperatures are encountered and when employed in conjunction with conventional catalysts, such as oxidation catalysts.

The microwave excitation of the molecules of the carbonaceous material, referred to as microwave catalysis, excites constituents, such as chemical reaction components, which have been adsorbed on, or in some instances attracted to, the reaction surfaces and thus produces a highly reactive condition.

Using methane and methanol as typical examples, the chemical reactions employed to carry out the hydrogen production are:

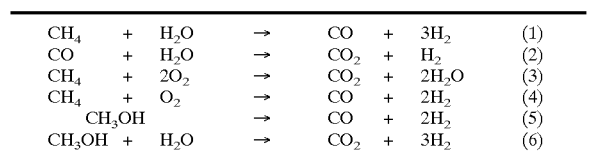

$$CH_4 + H_2O \rightarrow CO + 3H_2 \quad (1)$$
$$CO + H_2O \rightarrow CO_2 + H_2 \quad (2)$$
$$CH_4 + 2O_2 \rightarrow CO_2 + 2H_2O \quad (3)$$
$$CH_4 + O_2 \rightarrow CO + 2H_2 \quad (4)$$
$$CH_3OH \rightarrow CO + 2H_2 \quad (5)$$
$$CH_3OH + H_2O \rightarrow CO_2 + 3H_2 \quad (6)$$

Similar reactions occur for other alkanes and alkanols. In general in this writing the term "light hydrocarbons" will be used to identify reactant molecules containing no more than six carbon atoms and may include, besides hydrogen, other atoms, such as oxygen. Some of these reactions are endothermic and require significant energy input to occur; thus, conventionally they are carried out at high temperatures. Conversely some are exothermic and so can partially provide necessary energy to keep total energy requirements down and improve efficiency. Further the use of microwaves keeps the overall bulk reaction temperature much lower than conventional steam-reforming processes.

When oxygen gas is present, Eqs. (1)–(4) represent a series of competing reactions that produce hydrogen from methane and burn methane for energy. Thus to produce an efficient hydrogen-rich gas, fine tuning of the three reactants: methane, oxygen and water, and the reaction conditions, including the microwave power, is necessary. Other light hydrocarbons are employable, especially those commonly available and reasonable priced in order to keep the cost low.

When methanol is employed as shown in Eqs. (5)–(6), water, but no extra oxygen, is used since microwave catalysis decomposes the reactants. Other light alcohols, like ethanol, are employable if they are reasonably priced.

FIG. 1 shows a typical experimental microwave reactor 10 to produce hydrogen by microwaves using methane, oxygen, and steam. A microwave passing quartz tube 9 is packed with a bed 11 containing an oxidation catalyst on a microwave absorbing substrate; alternatively the bed is a carbonaceous material. Around the tube is a helix RF waveguide 12 that is fed from microwave connectors 13. The reactant gas 24 enters the bed 11 and is composed of a mixture of oxygen 23, with controller 33 and methane 22 with controller 32. Steam 21 also enters and is similarly controlled 31. Many other light hydrocarbons are also employable as reactants. The leaving product gas 14 is sampled 20 to determine its composition.

EXAMPLE 1

With both methane and oxygen in the desired chemical reactions, efficient amounts of these reactants were investigated using the microwave reactor of FIG. 1. Conventional gas chromatographs were employed for measuring steady-state gaseous concentrations. In Table 1 the methane reactant flow rate was varied, and the peak hydrogen percentage obtained in the product gas was slightly above 71 percent. The microwave catalysis bed was an oxidation/reduction catalyst (Pro VOC-7) mixed with fine silicon carbide particles. The microwave power was 800 watts while the steam flow was constant at 1.20 g/min, the oxygen flow was constant at 1.21 g/min, while the methane flow varied from 1.30 to 0.71 g/min.

EXAMPLE 2

Using the same experimental setup as in Example 1, Table 2 shows the oxygen reactant flow rate variation produced a peak hydrogen percentage obtained in the product gas again above 71 percent. The microwave catalysis bed was a fine bed of silicon carbide wash-coated with platinum-oxidation catalyst. The microwave power was 600 watts while the steam flow was constant at 2.40 g/min, the methane flow was constant at 1.30 g/min, while the oxygen flow varied from near zero to 1.82 g/min.

EXAMPLE 3

Using a similar experimental setup as in Example 1 with an activated carbon bed in place of the silicon carbide microwave-activated oxidation catalyst, methanol and steam flow are

TABLE 1

Product Gas Composition for Varied Methane Inlet Flow Rate
(% On dry basis)

| Run | $CH_4$ inlet mol/min | $O_2$ inlet mol/min | $CH_4$ | CO | $CO_2$ | $H_2$ |
|---|---|---|---|---|---|---|
| 1 | 0.0813 | 0.0378 | 27.55 | 17.54 | 7.94 | 46.97 |
| 2 | 0.074 | 0.0378 | 14.64 | 18.46 | 5.77 | 61.13 |
| 3 | 0.0625 | 0.0378 | 9.21 | 20.49 | 8.51 | 61.79 |
| 4 | 0.0535 | 0.0378 | 5.56 | 15.16 | 8.08 | 71.20 |
| 5 | 0.0446 | 0.0378 | 4.10 | 18.10 | 13.02 | 64.78 |

TABLE 2

Outlet Gas Composition for Varied Oxygen Inlet Flow Rate
(% On dry basis)

| Run | $CH_{4\ inlet}$ mol/min | $O_{2\ inlet}$ mol/min | $CH_4$ | CO | $CO_2$ | $H_2$ |
|---|---|---|---|---|---|---|
| 1 | 0.0813 | 0.0095 | 63.00 | 8.65 | 9.41 | 18.94 |
| 2 | 0.0813 | 0.0190 | 33.94 | 6.84 | 10.21 | 49.00 |
| 3 | 0.0813 | 0.0284 | 17.26 | 6.84 | 9.22 | 66.67 |
| 4 | 0.0813 | 0.0360 | 11.49 | 8.97 | 11.21 | 68.33 |
| 5 | 0.0813 | 0.0474 | 7.50 | 10.10 | 12.13 | 70.46 |
| 6 | 0.0813 | 0.0569 | 5.59 | 10.99 | 11.46 | 71.96 | adequate to produce largely hydrogen and carbon dioxide exit gas with 600–800 watts of microwave power. Thus carbon monoxide is largely minimized.

EXAMPLE 4

Using a similar experimental setup as in Example 1 with a silicon carbide microwave-activated reduction catalyst, methanol and steam flow are adequate to produce largely hydrogen and carbon dioxide exit gas with 600–800 watts of microwave power. Again carbon monoxide is largely minimized.

Note that in Table 1, the CO concentration was relatively constant and exceeded the $CO_2$ concentration that varied considerably. Conversely in Table 2 the CO concentration varied widely while the $CO_2$ concentration was relatively constant, but not greatly different from that of the CO. This shows the fine-tuning necessary to produce a satisfactory hydrogen-rich gas for a specific fuel cell because of the many variables in this system. These include but are not limited to inlet concentrations of methane, oxygen and water, the type of oxidation catalyst employed and its form of excitation by microwave absorbing carbonaceous material, such as silicon carbide, and the microwave generator power.

With a fixed amount of methanol as a reactant less fine-tuning is needed since only the flow of source of water is important in minimizing the carbon monoxide exit concentration at any given microwave energy level.

Similar fine-tuning occurs when other alkanes and alkanols are employed.

A process for the microwave production of hydrogen comprising passing a light hydrocarbon mixture through a bed irradiated with microwaves, wherein said bed comprises carbonaceous material to energize microwave catalysis, wherein said mixture further comprises sufficient water vapor for efficient hydrogen production, and wherein said mixture further comprises sufficient oxygen for efficient hydrogen production. The temperature of said gases exiting said bed does not exceed 400° F. The carbonaceous material further comprises being selected from the group consisting of activated carbon, char, soot, pyrolytic carbon, carbon black, activated charcoal, and metal carbides, while the light hydrocarbons further comprise being selected from the group of hydrocarbons consisting of no more than six carbon atoms per molecule. The microwaves consist of radiofrequency energy selected from the frequency range consisting of 500 to 5000 Mhz, and the bed further comprises being selected from the group of beds consisting of fluidized, fixed, semi-fluidized, suspended, and moving. The product produced by this process represents a unique combination of hydrogen, carbon dioxide, carbon monoxide and water potentially for use with fuel cells. To obtain the efficient hydrogen production, fine-tuning of the system is required, and this will vary with the type and amount of reactants employed as well as the reaction conditions of microwave power and the type of carbonaceous material.

A process for the microwave production of hydrogen comprising passing a controlled mixture of light hydrocarbons and oxygen through a bed irradiated with microwaves, wherein said bed is composed of an oxidation catalyst energized by a carbonaceous material, and wherein said bed is further exposed to water vapor in an amount substantially required for the steam reforming reaction with said light hydrocarbons. The water vapor is supplied either from steam injected into said bed or obtained from liquid water injected into said bed which then vaporizes at the bed temperature and is sufficient to carry out the steam reforming reaction. The carbonaceous material is preferably a substrate formed by the impregnation of a conventional substrate with metal carbides, often silicon carbide. Alternatively, the bed can be composed of a homogeneous mixture of fine silicon carbide particles and fine catalyst particles. The controlled mixture of light hydrocarbons and oxygen represents a ratio of moles of said oxygen to moles of carbon from said light hydrocarbons not exceeding unity. Since the light hydrocarbons, which normally contain not more than six carbon atoms per molecule, are often just methane, this is an equally mole mixture of oxygen and methane; however, for most best-mode situations this ratio is considerably below unity, since the primary purpose is to react said methane with water, not oxygen. The expected maximum leaving temperature of the gases from the bed is 400° F. The microwaves are radiofrequency energy selected from the frequency range consisting of 500 to 5000 Mhz, but commonly are either 915 or 2450 megahertz. The frequency employed affects the effective bed thickness since said bed penetration by microwaves is frequency dependent and further depends upon the mass of the bed particles. For 2450 Mhz microwaves the penetration thickness—that is, where the intensity of the RF energy has decreased by $e^{-1}$—of common bed particles is approximately one inch. The bed further is commonly selected from the group of beds consisting of fluidized, fixed, semi-fluidized, and suspended. The product produced by this process represents a unique combination of hydrogen, carbon dioxide, carbon monoxide and water potentially for use with fuel cells.

The efficient production of hydrogen requires the proper interaction of all the process elements and will vary considerably depending upon their exact specifications; thus, some fine-tuning of the process is required for efficient operation. For instance, using conventional heat of reactions, Eq.(3) produces enough energy by burning one mole of methane to support 4.32 moles of methane reacting to produce hydrogen in Eq.(1). Consequently the water required depends upon the amounts reacted by Eqs.(1)–(3) since one produces water while the others use water; thus, fine-tuning of the water supply is required.

A process for the microwave production of hydrogen comprising passing light alcohols through a bed irradiated with microwaves, wherein said bed is comprised of carbonaceous material, and wherein said bed is further exposed to water vapor in an amount substantially required for the effective production of hydrogen by microwave catalysis. The water vapor is supplied either from steam injected into said bed or obtained from liquid water injected into said bed which then vaporizes at the bed temperature and is sufficient to maximize the hydrogen production while keeping the carbon monoxide within acceptable limits. The light alcohols, which contain not more than six carbon atoms per molecule, is often methanol or ethanol as these are the most cost effective. The expected maximum leaving temperature of the gases from the bed is 400° F. The microwaves are radiofrequency energy selected from the frequency range consisting of 500 to 5000 Mhz, but commonly are either 915 or 2450 megahertz. The frequency employed affects the effective bed thickness since said bed penetration by microwaves is frequency dependent and further depends upon the mass of the bed particles. For 2450 Mhz microwaves the penetration thickness—that is, where the intensity of the RF energy has decreased by $e^{-1}$—of common bed particles is approximately one inch. The bed further is commonly selected from the group of beds consisting of fluidized, fixed, semi-fluidized, and suspended. The carbonaceous material further comprises being selected from the group consisting of activated carbon, char, soot, pyrolytic carbon, carbon black, activated charcoal, and metal carbides. However if conventional reduction catalysts are employed, silicon carbide is the normal carbonaceous material employed. The product produced by this process represents a unique combination of hydrogen, carbon dioxide, carbon monoxide and water potentially for use with fuel cells.

The foregoing description of the specific embodiments will so fully reveal the general nature of the invention that others can, by applying current knowledge, readily modify and/or adapt for various applications such specific embodiments without departing from the generic, concept, and therefore such adaptations or modifications are intended to be comprehended within the meaning and range of equivalents of the disclosed embodiments. It is to be understood that the phraseology or terminology herein is for the purpose of description and not of limitation.

I claim:

1. A process for the microwave production of hydrogen comprising:

passing light alcohols through a bed irradiated with microwaves, wherein said bed is comprised of carbonaceous material, and wherein said bed is further exposed to sufficient water vapor for efficient hydrogen production.

2. The process according to claim 1 wherein said water vapor further comprises steam.

3. The process according to claim 1 wherein said water vapor enters said bed in the form of liquid water.

4. The process according to claim 1 wherein said sufficient water vapor further comprises that the temperature of said gases exiting said bed does not exceed 400° F.

5. The process according to claim 1 wherein said microwaves further comprise radio-frequency energy of 500 to 5000 Mhz.

6. The process according to claim 1 wherein said bed further comprises being selected from the group of beds consisting of fluidized, fixed, semi-fluidized, and suspended.

7. The process according to claim 1 wherein said carbonaceous material further comprises being selected from the group consisting of activated carbon, char, soot, pyrolytic carbon, carbon black, activated charcoal, and metal carbides.

8. A process for the microwave production of hydrogen comprising:

passing light alcohols through a bed irradiated with microwaves, wherein said bed is composed of a reduction catalyst energized by metal carbides; and wherein said bed is further exposed to sufficient water vapor for efficient hydrogen production.

9. The process according to claim 8 wherein said water vapor further comprises steam.

10. The process according to claim 8 wherein said water vapor enters said bed in the form of liquid water.

11. The process according to claim 8 wherein said metal carbides consist essentially of silicon carbide.

12. The process according to claim 8 wherein said reduction catalyst energized by metal carbides further comprises impregnation of a reduction catalyst substrate with metal carbides.

13. The process according to claim 8 wherein said reduction catalyst energized by metal carbides further comprises a fine mixture of metal carbide and reduction catalyst material.

14. The process according to claim 8 wherein said sufficient water vapor further comprises that the temperature of said gases exiting said bed does not exceed 400° F.

15. The process according to claim 8 wherein said microwaves further comprise radio-frequency energy of 500 to 5000 Mhz.

16. The process according to claim 8 further comprising said light alcohols consisting of less than six carbon atoms.

17. The process according to claim 8 wherein said bed further comprises being selected from the group of beds consisting of fluidized, fixed, semi-fluidized, and suspended.

* * * * *